(12) United States Patent
Kunlin

(10) Patent No.: US 12,155,405 B2
(45) Date of Patent: Nov. 26, 2024

(54) NFC DEVICE UNLOCKING METHOD

(71) Applicant: STMicroelectronics (Grenoble 2) SAS, Grenoble (FR)

(72) Inventor: Thomas Kunlin, Fontaine (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 455 days.

(21) Appl. No.: 17/546,873

(22) Filed: Dec. 9, 2021

(65) Prior Publication Data

US 2022/0190859 A1 Jun. 16, 2022

(30) Foreign Application Priority Data

Dec. 14, 2020 (FR) ........................................ 2013187

(51) Int. Cl.
*H04B 1/16* (2006.01)
*H04B 5/70* (2024.01)

(52) U.S. Cl.
CPC ............. *H04B 1/1615* (2013.01); *H04B 5/70* (2024.01)

(58) Field of Classification Search
CPC .. H04B 1/1615; H04B 5/0025; H04B 5/0062; H04B 5/00; H04B 1/38; H04B 5/0075; H04B 7/0602; H04B 5/0081; H04B 5/02; H04B 1/3833; H04B 7/24; H04W 4/80; H04W 12/068; H04W 12/47; H04W 12/50; G06K 19/0723; H01Q 1/2216; H01Q 1/2225; H01Q 1/526; H01Q 21/28; H01Q 1/241; H01Q 1/2208
See application file for complete search history.

(56) References Cited

U.S. PATENT DOCUMENTS

| | | | | |
|---|---|---|---|---|
| 8,869,236 B1* | 10/2014 | Tonogai | ................... | H04L 63/08 |
| | | | | 713/153 |
| 11,388,573 B1* | 7/2022 | Hsu | ......................... | H04W 4/80 |
| 2015/0294126 A1* | 10/2015 | Colby | .............. | G06K 19/07345 |
| | | | | 340/10.51 |
| 2016/0359525 A1* | 12/2016 | Griffin | ...................... | H04B 1/38 |
| 2018/0189770 A1 | 7/2018 | Vuille et al. | | |
| 2022/0101992 A1* | 3/2022 | Porter | ....................... | H04B 5/72 |

* cited by examiner

*Primary Examiner* — Lana N Le
(74) *Attorney, Agent, or Firm* — Slater Matsil, LLP

(57) ABSTRACT

The present description concerns a method or device wherein an untraceability feature of a first near-field communication device is deactivated by an action on a hardware switch.

20 Claims, 4 Drawing Sheets

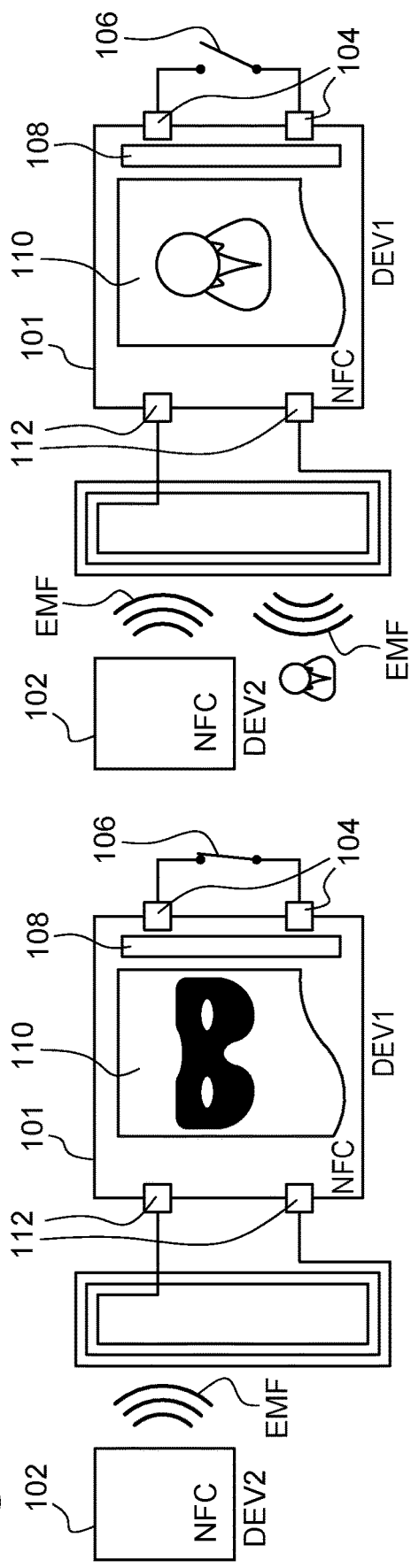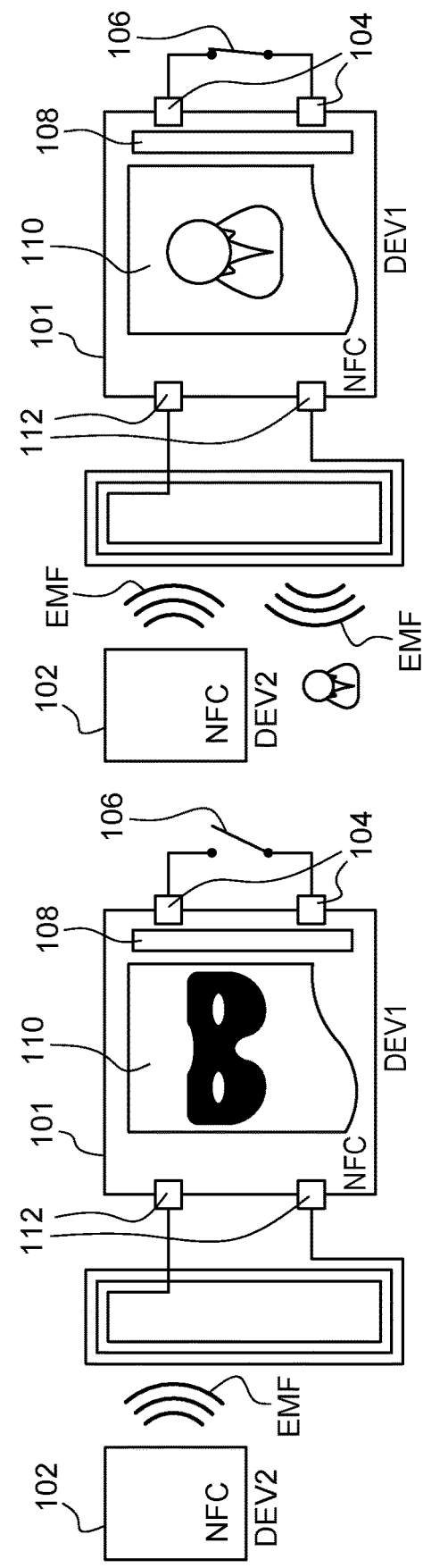
Fig. 2A
Fig. 2B

NFC DEVICE UNLOCKING METHOD

CROSS-REFERENCE TO RELATED APPLICATIONS

This application claims the priority to French Application No. FR 20/13187, filed on Dec. 14, 2020, which application is hereby incorporated by reference herein in its entirety.

TECHNICAL FIELD

The present disclosure generally relates to electronic circuits and, in particular embodiments, to device communications by radio frequency signals or electromagnetic fields.

BACKGROUND

Communication systems, having electromagnetic transponders, are more and more frequent, particularly since the development of near-field communication (NFC) technologies. These systems use a radio frequency electromagnetic field generated by an NFC device (terminal or reader) to detect and then communicate with another NFC device (card) located within range. In certain cases, the content of the NFC device must remain inaccessible until the acquiring of the device by its final user. It would be advantageous to provide for these cases.

SUMMARY

An embodiment provides a method wherein an untraceability feature of a first near-field communication device is deactivated by an action on a hardware switch.

An embodiment provides a near-field communication device having a hardware switch which deactivates an untraceability feature of the device.

According to an embodiment, a detector circuit is configured to detect a state change of the switch with respect to a native state.

According to an embodiment, the untraceability feature of the first device places it in a mode of lack of response to polling requests from a second device, including it in its field, except for requests according to a proprietary mode.

According to an embodiment, the access in proprietary mode to the first device when the untraceability feature is activated is performed after authentication of the second device by the first device.

According to an embodiment, a state change of the switch makes the first device visible.

According to an embodiment, an action on the switch causes an unlocking of the first device.

According to an embodiment, an action on the hardware switch is irreversible.

BRIEF DESCRIPTION OF THE DRAWINGS

Other advantages and features of the disclosure will become apparent upon examining the detailed description of implementations and embodiments, which are in no way limiting, and of the appended drawings wherein:

FIG. 2A is a schematic of an embodiment implementation mode of an unlocking method;

FIG. 2B is a schematic of another embodiment implementation mode of an unlocking method;

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the generation of the radio frequency signals and the interpretation thereof have not been detailed, the described embodiments and implementation modes being compatible with usual techniques of generation and interpretation of such signals.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front," "back," "top," "bottom," "left," "right," etc., or to relative positional qualifiers, such as the terms "above," "below," "upper," "lower," etc., or to qualifiers of orientation, such as "horizontal," "vertical," etc., reference is made to the orientation shown in the figures.

Unless specified otherwise, the expressions "around," "approximately," "substantially," and "in the order of" signify within 10% and preferably within 5%.

Near-field communication (NFC) devices or electromagnetic transponders are frequently used in convenience goods such as certain garment labels or in the packaging of certain food products. NFC devices or electromagnetic transponders can also be found in electronic products. For example, telephones may contain NFC devices or electromagnetic transponders, which enables the use of contactless payment applications or identification applications (e.g., public transport passes), among other examples.

Figure 1:
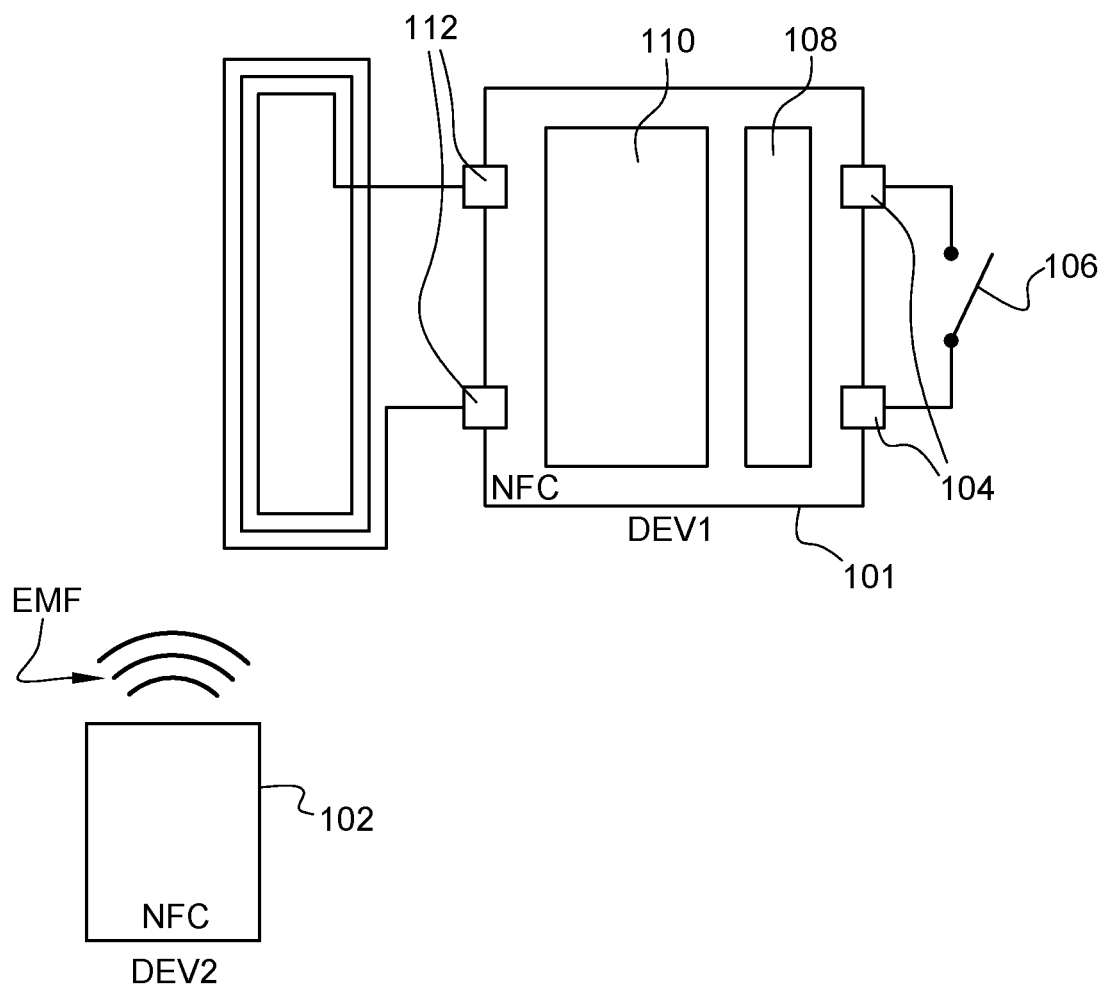
FIG. 1 is a schematic of an embodiment near-field communication system.

FIG. 1 schematically shows in the form of blocks an embodiment of a near-field communication system. Two near-field communication devices 101 (DEV1) and 102 (DEV2) are capable of communicating by near-field electromagnetic coupling. In embodiments, the two devices operate in peer-to-peer mode (P2P). In another embodiment, one of the two devices operates in reader mode while the other operates in card mode.

The following description assumes that a first device DEV1 forms an electromagnetic transponder of electronic tag (RFID TAG) type or an NFC device operating in card mode and that a second device DEV2 forms a transponder reader or an NFC device operating in reader mode. In embodiments, device DEV1 draws the energy necessary for the operation of the circuits of the device DEV1 from the electromagnetic field generated by the reader in the range of which it is located.

In embodiments, NFC device 102 (DEV2) or reader will initiate a communication with the NFC device 101 (DEV1) or tag by emitting an electromagnetic field EMF. This field is captured by an antenna connected (terminals 112) to device DEV1 when the latter is within range of device DEV2.

Device DEV1 further includes a controller no configured to perform instructions for the operation of the device.

In embodiments, device DEV1 is a dual-purpose device in card mode and includes a plurality of antennas and can initiate near-field communication.

Device DEV1 includes two tabs 104 indicating the state (i.e., OFF or ON) of a hardware switch 106 with a reversible or irreversible switching. The device DEV1 also includes a detector circuit 108, which allows detection of the state of the connection between the two tabs 104.

In embodiments, hardware switch 106 is used to certify to the consumer that the product is authentic and has, for example, never been opened. In other words, switch 106 can be used as a seal, which corresponds to a tamper loop.

Device DEV1 further includes an untraceability feature. When the untraceability feature is activated, device DEV1 may receive the communications initiated by reader DEV2, but it will not respond thereto and appear invisible to reader DEV2. When the untraceability feature is activated, device DEV1 is then untraceable by the other devices capable of initiating a communication. An exception to enabling communication with device DEV1 is provided when there is an authentication of a proprietary mode after the transmission by reader DEV2 of a specific frame recognized by device DEV1 as activating a proprietary communication mode. In embodiments, the proprietary communication mode enables updating or performing maintenance on the product, even when the untraceability feature is activated.

In embodiments, the tamper loop and untraceability feature functions comply with contactless transmission standards, such as ISO14443 and ISO15693, and their operation is known per se.

An initial or native (or factory) (i.e., OFF or ON) state is assigned to hardware switch 106 during the production of an electronic tag. In embodiments, hardware switch 106 has an irreversible switching configuration; if triggered (i.e., once switched from the initial OFF state to the ON state or conversely), it is impossible to reassign its initial state thereto.

Reference will be made hereafter to a reader or device in reader mode and to a tag or card or device in card mode to describe the respective functions of devices DEV2 and DEV1.

In embodiments, the device DEV1 is any electromagnetic transponder or electronic near-field communication device operating as an electromagnetic transponder. In embodiments, the device DEV1 is either remotely powered or not (e.g., with a battery). For example, device DEV1 can be an active or passive electronic tag of radio frequency identification tag (RFID TAG) type, a contactless card, an NFC device dedicated to the card mode, a dual-purpose NFC device operating in reader mode, or the like.

In embodiments, the device DEV2 is any electromagnetic transponder reader or electronic near-field communication device operating as an electromagnetic transponder reader. For example, device DEV2 can be a contactless card reader, a passive electronic tag of radio frequency identification tag type, a contactless card, an NFC device dedicated to the card mode, a dual-purpose device operating in reader mode, or the like.

In embodiments, in response to the tag or card DEV1 capturing an electromagnetic field generated by a nearby reader, detector circuit 108 verifies the state of the connection between tabs 104, that is, the state of switch 106.

For example, if the switch is in the ON position, the information received by detector circuit 108 will be state 1. Conversely, if the switch is in the OFF position, the information received by detector circuit 108 will be state 0.

In embodiments, the described implementation modes and embodiments are provided to combine the tamper and untraceability functions. More precisely, it is provided to use the tamper switch to unlock the untraceability of a tag or card and make it visible.

FIG. 2A schematically illustrates an embodiment implementation mode of an unlocking method. In embodiments, it is assumed that switch 106 is in a native or initially in the ON state (state 1). In this case, during the production of tag or card 101, DEV1, (on the left-hand side of FIG. 2A), the untraceability feature is activated and is associated with a state 1 delivered by detector circuit 108. When reader 102, DEV2, initiates a communication and a tag or card DEV1 is within range of an EMF field generated by the reader, the tag or card starts a protocol of reading of polling frames transmitted by the reader. The position of switch 106 being ON, detector circuit 108 detects state 1 via tabs 104, and the untraceability feature remains activated. Thus, tag or card DEV1 does not answer to the frames transmitted by the reader and therefore returns no communication. Reader DEV2 then dos not detect tag or card DEV1, or considers that it is a transponder incompatible with the features supported by the reader.

In some instances, it is useful to make a device in card mode untraceable until its acquiring for its final use. This may, for example, prevent another device in reader mode from recovering data contained in the tag or card or, in another example, prevent another device in reader mode from modifying a source code contained in tag or card DEV1 (e.g., the price of the product in the case of a garment label). In other words, leaving the untraceability feature of tag or card DEV1 activated all along its marketing history enables to prevent a possible hacking and guarantees the proper operation of tag or card DEV1.

When the device in card mode DEV1 is acquired by its final user, a maneuver (e.g., initiated by the user on unpacking of the product) will irremediably actuate hardware switch 106, switching it from the initial ON state to the OFF state (as illustrated in the right-hand portion of FIG. 2A). According to an embodiment, switch 106 is a conductive wire which is broken on unpacking of the product. Thus, when the device in card mode DEV1 is within range of a device in reader mode DEV2 which generates an electromagnetic field EMF, device DEV1 (generally remotely powered by this filed) and, more precisely, its detector circuit 108 detects the state change of the switch (e.g., which returns state 0 and no longer state 1). The detector circuit then deactivates the untraceability feature of tag or card DEV1. Tag or card DEV1 can then send and receive data, via field EMF, to and from reader DEV2.

Thus, the use of switch 106 is diverted from its current use as an authenticity mark. Its action is here coupled to the untraceability feature, deactivating it when the switch is reversibly or irreversibly switched.

FIG. 2B schematically illustrates another embodiment implementation mode of an unlocking method. As compared with the implementation mode illustrated in FIG. 2A, it is here provided for the initial or native state of hardware switch 106, shown on the left-hand side of the drawing, to be OFF.

In embodiments, in response to the device containing the detector circuit is powered (within range of another NFC device), detector circuit 108 detects an OFF state (state 0) of switch 106, via tabs 104. The untraceability feature is in this case is associated with state 0. In this configuration, when the device in card mode DEV1 is within range of a reader DEV2, the information detected by detector circuit 108 remains, in this example, still 0, the untraceability feature remains activated, and device DEV1 does not respond to device DEV2.

FIG. 2B shows on its right-hand side the device in card mode DEV1 once hardware switch 106 has been actuated. Switch 106 is now in the ON position (e.g., switch 106 is actuated when the user removes an insulating shield between two connectors of device 101 coupled to tabs 104). Thus, when transponder DEV1 is within range of reader DEV2, detector circuit 108 detects the new state, for example, 1, via tabs 104 after the state change of the switch and deactivates the untraceability feature of the device.

Figure 3:
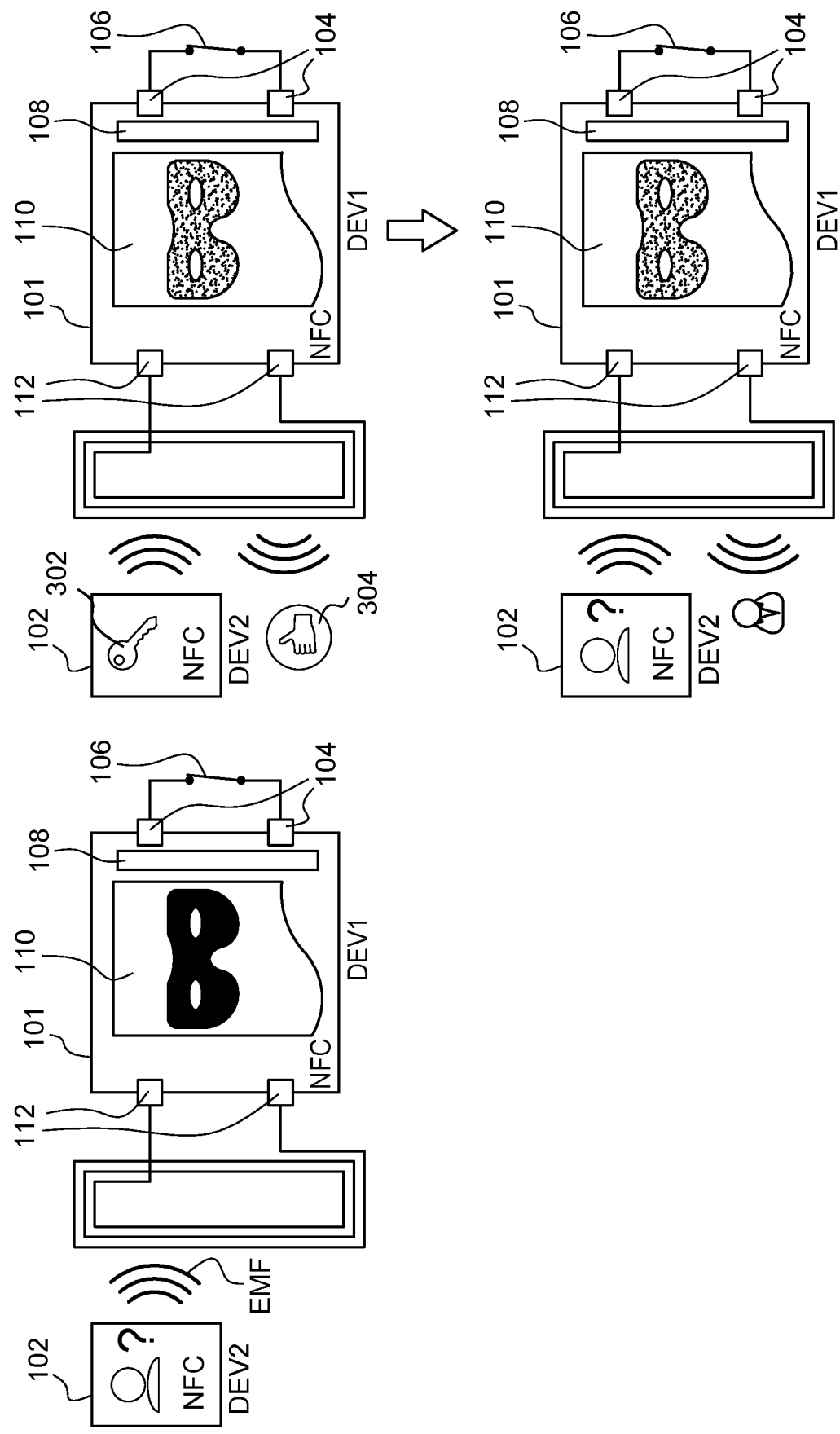
FIG. 3 is a schematic of an embodiment implementation of communication by authentication between two near-field communication devices.

FIG. 3 schematically illustrates the embodiment implementation of a communication by authentication between two NFC devices. In the example of FIG. 3, the untraceability feature is associated with the initial ON state (state 1) of switch 106 and is activated.

It is assumed (diagram on the left-hand side of FIG. 3) that a standard NFC reader DEV2 attempts accessing a NFC tag or card DEV1. Device DEV1 receives the signal transmitted by device DEV2 via antenna 112. Switch 106 being ON, detector circuit 108 detects state 1 and the untraceability feature remains activated. Tag or card DEV1 does not respond to reader DEV2, which remains in polling mode and then does not detect device DEV1.

In some instances, it is useful, to perform an operation of maintenance or an operation of update on device DEV1. Such operations are generally performed during the lifetime of the product. For electronic tags associated with products, it may be advantageous to access for purposes of inventory, for example, in a store or warehouse. However, this access should not result in a switching of the tag to the traceability mode, the latter having to keep this mode as long as no mechanical action is performed on switch 106.

FIG. 3 shows an example of the implementation of a communication, for example, to perform one of the above-mentioned operations on its upper right-hand side. For this purpose, it is provided that, when a reader DEV2 activates a tag or card DEV1 according to a specific protocol, typically associated with a shared secret or public key authentication process 320, tag or card DEV1 recognizes the authentication procedure and if the key supplied by reader DEV2 is valid, tag or card DEV1 authorizes the access in proprietary mode 304 to device DEV2. The tag or card becomes visible and thus accessible to the reader, even though the non-traceable mode remains activated (switch 106 remaining ON). Such access in proprietary mode is usual per se.

FIG. 3 shows on its lower right-hand side the communication between devices DEV2 and DEV1 when reader DEV2 is in proprietary mode. Switch 106 is still in its initial ON state (state 1). Detector circuit 108 thus detects no state change of switch 106, and the untraceability feature remains activated. In practice, the verification of the state of the switch is performed at the powering ON of the transponder. Reader DEV2 has access to tag or reader DEV1 in proprietary mode. The communication is possible between the two devices, and reader DEV2 may, for example, perform an operation of maintenance or update tag or card DEV1 or capture its identifier for counting or inventory purposes. Any other reader, not shown in FIG. 3, which does not have the key or password, will not be able to communicate with tag or card DEV1.

Figure 4:
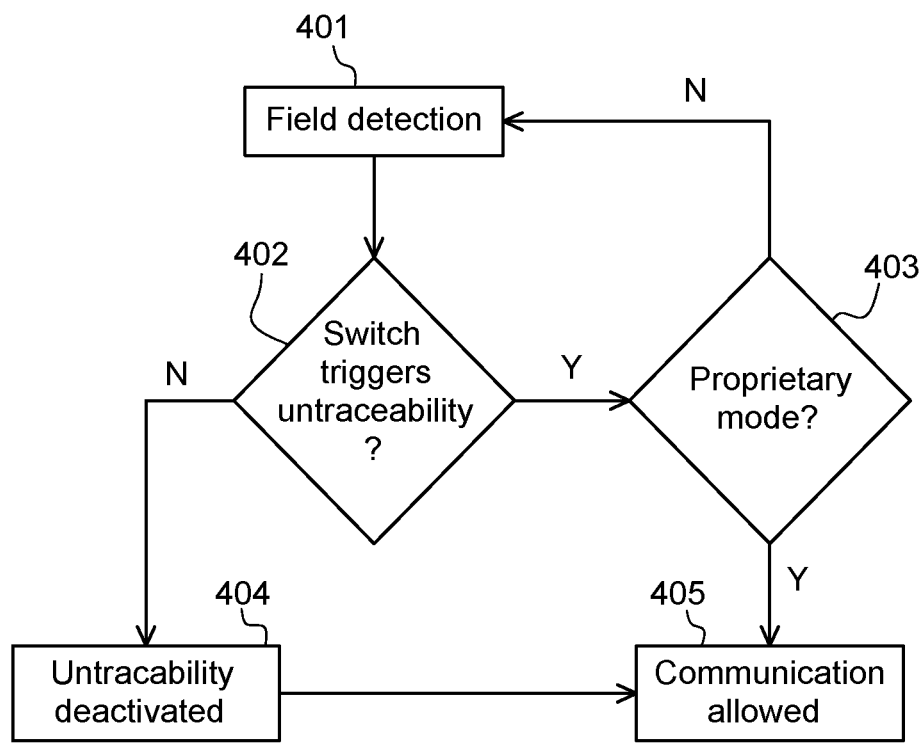
FIG. 4 is flow diagram of an embodiment method of the implementation mode of communication between near-field communication devices.

FIG. 4 is a flow diagram showing steps of an embodiment implementation mode of communication between NFC devices.

At step 401 (i.e., Field detection), an NFC tag or card DEV1 detects an electromagnetic field generated by another nearby NFC device, typically a reader DEV2. The detector circuit 108 of tag or card DEV1 detects, via contacts 104 (not shown in FIG. 4), the state of switch 106. In particular, it detects at step 402 (i.e., switch triggers untraceability?) whether switch 106 is still in its initial state or a post-initial state. The initial state of the switch may be either OFF (e.g., an insulating shield between two connectors coupled to tags 104) or ON (e.g., switch 106 is a conductive wire of fuse type coupling tabs 104).

In the case where switch 106 is still in its initial state (i.e., output "Y" of step 402), the device (the tag circuit) will, at step 403 (i.e., proprietary mode?), verify whether the communication is an authentication procedure for access in proprietary mode by reader DEV2.

If (i.e., output "N" of step 403) it is not an authentication procedure, the method loops onto field detection step 401 and does not communicate back with device DEV2. If DEV2 initiates an authentication procedure, but the authentication fails, for example, in the case where the key is not recognized, the method also loops onto step 401.

In embodiments, in case of a failing authentication procedure, the method may implement an intermediate step, not shown in FIG. 4, informing DEV2 that its authentication attempt has failed.

In the case where the authentication has succeeded, the method ends (i.e., output "Y" of step 403) at step 405 (i.e., communication allowed), where the communication between the two devices is allowed.

In the case where detector circuit 108 detects a change of the initial state of switch 106 (i.e., output "N" of step 402), the untraceability feature is deactivated a step 404 (Untraceability deactivated), and the method ends at step 405 allowing the communication between the two devices.

An advantage of the described embodiments is that they enable to keep a non-detectability of tag or card as long as a hardware action has not been performed on its tamper loop. This combination of both the untraceability and tamper loop functions improves the security of the tags and card against frauds or attacks while allowing a correct operation in proprietary mode. However, this brings back to the usual operation, which is more sensitive to possible attacks. The described embodiments more particularly secure the tag or card as long as its tamper loop is active.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereabove. In particular, the implementation of the protocols of polling, authentication, and communication between near-field communication devices is usual per se and the described embodiments are compatible with usual protocols.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method, comprising:
   detecting, by a first near field communication (NFC) device, an electromagnetic field generated by a second NFC device;
   detecting, by a detector circuit of the first NFC device, an initial state of a hardware switch of the first NFC device, the hardware switch comprising the initial state and a post-initial state;
   activating an untraceability feature of the first NFC device in response to detecting the initial state of the hardware switch, wherein, while the untraceability feature is activated, the first NFC device does not transmit communications to the second NFC device in response to communications received from the second NFC device;
   deactivating the untraceability feature of the first NFC device in response to either of:
      detecting the post-initial state of the hardware switch, and
      an authentication procedure identifying the second NFC device; and
   allowing communications between the first NFC device and the second NFC device in response to the deactivating of the untraceability feature.

2. The method of claim 1, further comprising:
   determining, in response to detecting that the hardware switch is in the initial state, a communication corresponding to the electromagnetic field being the authentication procedure for accessing, by the second NFC device, the first NFC device in a proprietary mode.

3. The method of claim 2, further comprising authenticating, by the first NFC device, the communication corresponding to the electromagnetic field being the authentication procedure for accessing, by the second NFC device, the first NFC device in the proprietary mode.

4. The method of claim 2, wherein the untraceability feature corresponds to a lack of response mode by the first NFC device to polling requests from the second NFC device.

5. The method of claim 1, wherein the initial state is assigned to the hardware switch during the production of the first NFC device.

6. The method of claim 5, wherein a change of state of the hardware switch from the initial state to the post-initial state is irreversible.

7. The method of claim 1, further comprising making visible the first NFC device to the second NFC device in response to the hardware switch being in the post-initial state.

8. The method of claim 1, further comprising unlocking the first NFC device in response to activating the hardware switch from the initial state to the post-initial state.

9. A first near field communication (NFC) device, comprising:
   an antenna configured to detect an electromagnetic field generated by a second NFC device;
   a hardware switch comprising an initial state and a post-initial state;
   a detector circuit coupled to the hardware switch, the detector circuit configured to detect whether the hardware switch is in the initial state or is in the post-initial state; and
   a controller configured to control operations of the first NFC device, wherein the controller is configured to:
      activate an untraceability feature of the first NFC device in response to detecting the initial state of the hardware switch, wherein, while the untraceability feature is activated, the antenna is not allowed to transmit communications to the second NFC device in response to communications received from the second NFC device,
      deactivate the untraceability feature of the first NFC device in response to either of:
         detecting the post-initial state of the hardware switch, and
         an authentication procedure identifying the second NFC device,
      wherein, while the untraceability feature is deactivated, the antenna is allowed to transmit communications to the second NFC device in response to communications received from the second NFC device.

10. The first NFC device of claim 9, wherein the controller is further configured to:
    determine, in response to detecting that the hardware switch is in the initial state, a communication corresponding to the electromagnetic field being the authentication procedure for accessing, by the second NFC device, the first NFC device in a proprietary mode; and
    allow communications between the first NFC device and the second NFC device in response to determining that the communication is the authentication procedure.

11. The first NFC device of claim 10, wherein the controller is further configured to authenticate the communication corresponding to the electromagnetic field being the authentication procedure for accessing, by the second NFC device, the first NFC device in the proprietary mode.

12. The first NFC device of claim 10, wherein the controller is further configured to make visible the first NFC device to the second NFC device in response to the hardware switch being in the post-initial state.

13. The first NFC device of claim 10, wherein the controller is further configured to unlock the first NFC device in response to activating the hardware switch from the initial state to the post-initial state.

14. The first NFC device of claim 10, wherein the untraceability feature corresponds to a lack of response mode by the first NFC device to polling requests from the second NFC device.

15. The first NFC device of claim 9, wherein the initial state is assigned to the hardware switch during the production of the first NFC device.

16. The first NFC device of claim 9, wherein a change of state of the hardware switch from the initial state to the post-initial state is irreversible.

17. A method of using a first NFC device, the method comprising: activating an untraceability feature of the first NFC device in response to detecting an initial state of a hardware switch, wherein, while the untraceability feature is activated, the first NFC device does not transmit communications to a second NFC device in response to an electromagnetic field received from the second NFC device; deactivating the untraceability feature of the first NFC device in response to either of: detecting a post-initial state of the hardware switch, and an authentication procedure identifying the second NFC device; and allowing communications between the first NFC device and the second NFC device in response to the deactivating of the untraceability feature.

18. The method of claim 17, further comprising authenticating, by the first NFC device, a communication corresponding to the electromagnetic field being an authentication procedure for accessing, by the second device, the first NFC device in a proprietary mode.

19. The method of claim 17, wherein the untraceability feature corresponds to a lack of response mode by the first NFC device to polling requests from the second device.

20. The method of claim 17, wherein the initial state is assigned to the hardware switch during the production of the first NFC device, and wherein a change of state of the hardware switch from the initial state to the post-initial state is irreversible.

* * * * *